US009608483B2

(12) United States Patent
Rasmussen

(10) Patent No.: US 9,608,483 B2
(45) Date of Patent: Mar. 28, 2017

(54) ELECTRICAL MACHINE WITH MAGNETIC FLUX INTENSIFIER

(71) Applicant: Envision Energy (Denmark) ApS, Silkeborg (DK)

(72) Inventor: Peter Rasmussen, Svendborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 700 days.

(21) Appl. No.: 13/968,818

(22) Filed: Aug. 16, 2013

(65) Prior Publication Data

US 2014/0049131 A1 Feb. 20, 2014

(30) Foreign Application Priority Data

Aug. 17, 2012 (DK) ................. 2012 70486

(51) Int. Cl.
*H02K 1/27* (2006.01)
*H02K 15/03* (2006.01)
*H02K 21/14* (2006.01)
*H02K 1/02* (2006.01)
*H02K 7/18* (2006.01)

(52) U.S. Cl.
CPC ........... *H02K 1/2766* (2013.01); *H02K 1/278* (2013.01); *H02K 15/03* (2013.01); *H02K 1/02* (2013.01); *H02K 7/1838* (2013.01); *H02K 21/14* (2013.01); *H02K 2213/03* (2013.01); *Y02E 10/725* (2013.01); *Y10T 29/49012* (2015.01)

(58) Field of Classification Search
CPC ....... H02K 15/03; H02K 1/2766; H02K 1/278
See application file for complete search history.

(56) References Cited

U.S. PATENT DOCUMENTS

| 5,631,512 | A | 5/1997 | Kawabata et al. |
| 6,879,075 | B2 | 4/2005 | Calfo et al. |
| 7,545,067 | B2 | 6/2009 | Drexlmaier |
| 7,642,691 | B2 * | 1/2010 | Morita ................. H02K 21/044 310/156.72 |
| 8,829,752 | B2 * | 9/2014 | Chen ....................... H02K 1/27 310/156.07 |
| 2004/0145263 | A1 | 7/2004 | Kojima et al. |
| 2004/0150283 | A1 | 8/2004 | Calfo et al. |
| 2006/0061226 | A1 | 3/2006 | Kim et al. |
| 2012/0126637 | A1 | 5/2012 | Ankeney et al. |

FOREIGN PATENT DOCUMENTS

| CN | 1516915 A | 7/2004 |
| CN | 1750360 A | 3/2006 |
| EP | 2 063 514 A1 | 5/2009 |
| WO | 98/25330 A2 | 6/1998 |
| WO | 2011/135056 A1 | 11/2011 |

* cited by examiner

*Primary Examiner* — Dang Le
(74) *Attorney, Agent, or Firm* — James Creighton Wray; Meera P. Narasimhan

(57) ABSTRACT

An electrical machine has a stator-rotor configuration in which the rotor has at least two poles. The poles are configured to rotate in an angle and to electromagnetically interact with one or more teeth that is a part of a stator adjoined in a fixed position to the electrical machine. The configuration forms a gap in the lateral direction between the poles and the teeth. At least one of the poles is formed of a permanent magnet material and a magnetic flux intensifier is arranged relative to at least one of the poles and one of the teeth. The magnetic flux intensifier is configured to concentrate the magnetic field lines between a pole and the teeth.

17 Claims, 5 Drawing Sheets

ELECTRICAL MACHINE WITH MAGNETIC FLUX INTENSIFIER

BACKGROUND OF THE INVENTION

Field of the Invention

The present invention relates to an electrical machine comprising:

a rotor configured to rotate in a direction relative to a stator, where the rotor comprises one or more poles configured to rotate in an angle relative to a center of the rotor, where the poles are configured to interact with one or more teeth in a stator via an electromagnetic field;

the stator is configured to be fixed in a stationary position in the electrical machine, where a gap, such as an air gap, is provided between the teeth and the poles in a lateral direction; and at least one magnetic flux intensifier is arranged relative to at least one of the poles and at least one of the teeth, where the magnetic flux intensifier is configured to concentrate the magnetic field lines between that pole and that tooth during rotation of the rotor.

Description of Related Art

Magnetic flux leakage in the air gap between a stator and a rotor is a general problem in generators and motors, in particular in generators for wind turbines.

Various configurations and shapes of poles in rotors and stators have been proposed and it is commonly known that using a non-magnetic material as an intermediate ring holding the permanent magnets.

Recently, a trapezoidal magnetic flux intensifier pole arrangement has been proposed in U.S. Pat. No. 6,879,075 B2. This patent discloses a permanent magnet synchronous machine with a circumferential-oriented rotor assembly with trapezoidal shaped permanent magnets arranged between inversed trapezoidal shaped iron pole pieces.

U.S. Pat. No. 7,545,067 B2 discloses a permanent magnet rotor for generator, where the rotor has a shaft and a cylindrical plastic cage. The permanent magnets are inserted into recesses in the plastic cage that are shaped as dovetailed retainers for fixing the trapezoidal shaped permanent magnets tightly in the dovetailed retainers.

International Patent Application Publication WO 2011/135056 A1 discloses a permanent magnetic generator designed for wind turbines. This application discloses a cylindrical shaped rotor with an alternating arrangement of magnetic steel pole pieces and permanent magnet assemblies, where the trapezoidal shaped pole spices and the assemblies extend in a direction parallel to the rotation center axis of the rotor. Each assembly comprises two rectangular shaped permanent magnets placed on either side of a triangular shaped wedge made of magnetic iron.

Although these embodiments provide improved magnetic coupling techniques in the prior art, they still use a substantial amount of precious magnetic material. This increases the production costs for such magnetic rotor-stator couplings.

U.S. Pat. No. 5,631,512 discloses a motor having cylindrical shaped rotor having alternating arrangement of air gaps, permanent magnets, and pole pieces made of a soft magnetic material. The pole pieces are placed on one side of the permanent magnets, while the air gaps are located on the other side of the permanent magnets separating it from an adjacent pole piece. The pole pieces are formed by an integrated part of the rotor body while the air gaps are formed by recesses in the body of the rotor. The permanent magnets and the pole pieces have the same arc length. The soft magnetic material is only arranged on the front side of the permanent magnets relative to the rotation direction of the rotor which means that magnetic flux at the backside will not be intensified, since the air gap acts as a non-magnetic material. Furthermore, this configuration still uses a lot of expensive magnetic material to form the rotor assembly.

SUMMARY OF THE INVENTION

It is an object of the invention to provide a stator-rotor configuration for electrical machines that has an improved dense magnetic flux in the gap or a gap that is larger than hereto known.

Another object of the invention is to provide a stator-rotor configuration that uses less magnetic material the hereto known.

A further object of the invention is to provide alternative configurations that result in the intensification of magnetic fields.

These objects are achieved according to an electrical machine comprising:

the magnetic flux intensifier comprises a first type layer of a high energy magnetic material with magnetic field lines oriented essentially radially, and at least a second type layer of a second magnetic material having a magnetic strength that is lower than that of the high energy magnetic material, and where the first type layer is sided between two second type layers.

This provides an electrical machine with an improved dense magnetic flux in the lateral gap, i.e., parallel to the radius of the rotor, or which has a gap that is larger than hereto known. This configuration is well-suitable for any applications in which such a stator-rotor configuration may be used, such as generators or motors for wind turbines, electrical power plants, transport units (e.g., vehicles or boats), industrial tools or appliances.

This allows for a more compact generator and/or motor and hence a more efficient electrical machine. It also allows for larger tolerances in the displacements between the stator and rotor during operation.

It further allows the amount of costly magnetic material used in the stator-rotor configuration to be reduced compared to previous configurations.

It further provides alternative configurations that result in the intensification of magnetic fields between the stator and the rotor.

Magnetic flux intensifier is defined as a flux guide or a flux concentrator that collects magnetic field lines from a transmitter, e.g., a magnet, and guides them to a receiver, e.g., a coil, through a well-defined magnetic path. The term magnetic flux concentrator is well defined within the technical field.

According to an embodiment of the invention, the magnetic flux intensifier is configured as a pole in which the layers over an arc length form a sandwich of layers where at least a third type layer forms a gap between the second type layer and one of the poles placed adjacent to the magnetic flux intensifier.

The configuration of the low energy magnetic material may be placed on one or both sides of a high energy magnetic material for reducing the flux leakage at the edges. The low energy magnetic material may advantageously be placed at both sides for reducing flux leakage both as the front and back of the magnetic flux intensifier passes a particular stator winding. This also allows the rotation direction of the rotor to be reversed without effecting the flux distribution between the rotor and stator.

This configuration of the poles results in a magnetic intensifier that saves expensive and precious high energy magnetic material by replacing it with cheap and resourceful low energy magnetic materials. This configuration of the magnetic flux intensifier may be used instead one or more of the conventional poles in the electrical machine and/or be placed relative to at least two adjacent conventional poles.

Occasionally, high energy magnetic materials are referred to as hard magnetic materials and low energy magnetic materials as soft magnetic materials.

According to an embodiment of the invention, the magnetic flux intensifier further comprises:

at least another first type layer which is sided between the second type layers and the third type layers and comprises a high energy magnetic material with magnetic field lines oriented essentially laterally.

This provides for a magnetic intensifier configuration that allows for an even further reduction of the magnetic flux leakage at the edges or a more precisely designed magnetic coupling between the teeth and the poles.

According to an embodiment of the invention, the magnetic flux intensifier further comprises:

at least another second type layers which is sided between the first type layers and the third type layers and comprises a second magnetic material having magnetic properties that differs from the properties of the first magnetic material.

This magnetic intensifier configuration allows for a further reduction in the amount of high energy magnetic material used in the stator-rotor configuration.

According to an embodiment of the invention, the magnetic flux intensifier around a central layer defined by the first type layer comprises a predetermined number of successive layers, where a first successive type layer of a high energy magnetic material is sided by a second successive type layer of a second magnetic material having magnetic properties that differs from the properties of the first magnetic material, and where the successive layers are finished by the third type layer.

The magnetic flux intensifier may form a general sandwich construction or laminate configuration with multiple layers where the layers are arranged in a radial direction, i.e., parallel to the rotation direction of the rotor. This allows the magnetic flux intensifier to face more than one winding in the stator at all time, e.g., at least two or three windings. A plurality of successive layers may be arranged on both sides of the central layer, such one, two, three, four or five.

According to an alternative description of an embodiment of the invention, the magnetic flux intensifier around a central layer defined by the first type layer comprises:

a predetermined number of successive layers, where a first successive type layer of a low energy magnetic material is sided by a second successive type layer of a second magnetic material having magnetic properties that differs from the properties of the first magnetic material, and where the successive layers are finished by the third type layer.

According to an embodiment of the invention, each successive layer type in the magnetic intensifier has an arch length that decreases from the central layer towards the third type layer.

Thereby providing a configuration where the central layer $I_0$ has the greatest length of all the layers and the outermost layer $I_N$ has the smallest length of all the layers. If the layer $II_N$ is the outermost layer, then it has the smallest length.

This allows the magnetic flux intensifier to have a prism effect on the magnetic field lines where the magnetic field lines are concentrated towards a single point.

This provides a standard configuration that in a balanced way reduces the need for high energy magnetic material and reduces the edge leakage.

According to an embodiment of the invention, the magnetic intensifier is configured so that the magnetic strength of at least the high energy magnetic material used in each successive layer decreases from the central layer towards the third type layer.

This provides another standard configuration that in a balanced way reduces the need for high energy magnetic material and reduces the edge leakage. Other configuration allowing the magnetic flux intensifier to have a prism effect may be used in accordance with the invention.

According to an embodiment of the invention, at least one of the successive layers located at one side of the central layer has an arc length that differs from the arc length of the same successive layer located at the opposite side of the central layer.

The magnetic flux intensifier may have an asymmetric configuration where at least two layers located at either side of the central layer and in the same successive position from the central layer have different sizes and/or shapes. In this particular embodiment, one layer of low energy magnetic material located at one side of the central layer and another layer of low energy magnetic material located at the same successive position on the other side may have different arc lengths. Likewise, two layers of high energy material located on both sides of the central layer and in the same successive position may have different arc lengths.

According to one embodiment, the magnetic flux intensifier has a trapezoidal cross-sectional shape, wherein the at least three layers are configured as circles.

This provides a magnetic flux intensifier that is shaped as a cone shaped pole. This allows the magnetic flux intensifiers and/or poles to be arranged in different patterns or offset relative to each other, thereby allowing the stator-rotor configuration to be adapted to different applications.

According to an embodiment of the invention, the high energy magnetic material for layer type is chosen from a group of magnetic materials having a magnetic remanence $B_r$ above 0.5 Tesla or above 1.0 Tesla or comprise at least neodymium.

A magnetic remanense (remnant magnetization after removal of magnetic field) of above 1.0 Tesla will be desirable and a person skilled in the art will choose the high energy magnetic material from a standard table or based on a trade name.

Likewise, the person skilled in the art will appreciate that magnetic remanence is just one measure of "strength" and using tables, textbooks, experience or measurements, the person skilled in the art will know how to categorize magnetic materials available or listed without the magnetic remanence.

According to an embodiment of the invention, the low energy magnetic material for layer type is chosen from a group of magnetic materials having a magnetic remanence $B_r$ below 0.5 Tesla or below 1.0 Telsa or is made of iron or a ferrite alloy.

The prism effect may be achieved by using a high energy magnetic material having a field strength, i.e., magnetic remanence, of at least 1.0 Tesla while the low energy magnetic material has a field strength, i.e., magnetic remanence, of less than 0.5 Tesla.

According to a particular embodiment, the electrical machine is a generator for generating power or a motor for driving a drivable unit.

The magnetic flux intensifier configuration is particularly well suited for generators, like wind turbine generators, or motor, like electromagnetic motors. The size and configuration of the generator or motor may be adapted to the desired application.

An object of the invention is achieved by configuring a stator-rotor configuration for an electrical machine with at least one pole made by a method of making a pole with a magnetic flux intensifier as disclosed, the method comprising the steps of:

making a plane sandwich of successive first type layers and second type layers, bending the plane sandwich around a center point of the central first type layer in a curvature defined by the curvature of a rotor core and the stator.

This provides an easy way of constructing a magnetic flux intensifier and adopting it for subsequent fitting it into a particular rotor-stator configuration of an electrical machine. This magnetic flux intensifier may advantageously be fitted into a stator-rotor configuration of a wind turbine generator or a motor for a particular application.

The higher flux density in the pole may be achieved by providing a pole with a greater height than conventionally but still uses less amount of high energy magnet material than conventionally.

High energy magnetic materials are generally known as rare-earth magnets since the strong permanent magnets are made from alloys of rare earth elements. Low energy magnetic materials are generally known as magnetic materials based on ferromagnetic or ferrite materials.

Magnets can be compared by remanence ($B_r$), which measures the strength of the magnetic field; coercivity ($H_{ci}$), the material's resistance to becoming demagnetized; energy product ($BH_{max}$), the density of magnetic energy; and Curie temperature ($T_c$), the temperature at which the material loses its magnetism.

High energy magnets or rare earth magnets have higher remanence, much higher coercivity and energy product, but (for neodymium) lower Curie temperature than other types. The table below compares the magnetic performance of the two types of rare earth magnet, neodymium ($Nd_2Fe_{14}B$) and samarium-cobalt ($SmCo_5$), with other types of permanent magnets.

| Magnet | $B_r$ (T) | $H_{ci}$ (kA/m) | $(BH)_{max}$ (kJ/m³) | $T_c$ (° C.) |
|---|---|---|---|---|
| $Nd_2Fe_{14}B$ (sintered) | 1.0-1.4 | 750-2000 | 200-440 | 310-400 |
| $Nd_2Fe_{14}B$ (bonded) | 0.6-0.7 | 600-1200 | 60-100 | 310-400 |
| $SmCo_5$ (sintered) | 0.8-1.1 | 600-2000 | 120-200 | 720 |
| $Sm(Co,Fe,Cu,Zr)_7$ (sintered) | 0.9-1.15 | 450-1300 | 150-240 | 800 |
| Alnico (sintered) | 0.6-1.4 | 275 | 10-88 | 700-860 |
| Sr-ferrite (sintered) | 0.2-0.4 | 100-300 | 10-40 | 450 |

A preferred strong permanent magnet is of the generic neodymium-type or also generally known as NdFeB, NIB, or Neo and is made from an alloy of neodymium, iron, and boron ($Nd_2Fe_{14}B$).

It is appreciated that the magnetic flux intensifier configuration described above advantageously can be used in any generator or motor system for any electrical machines, such as wind turbines or other power plants. As such is disclosed a generic magnetic flux intensifier, a generator with a magnetic flux intensifier as disclosed and in general a system with a generator configured with a magnetic flux intensifier as disclosed.

Likewise, the disclosed magnetic flux intensifier can be applied in motors.

This invention is described below in greater detail in relation to the drawings.

DETAILED DESCRIPTION OF THE INVENTION

Figure 1:
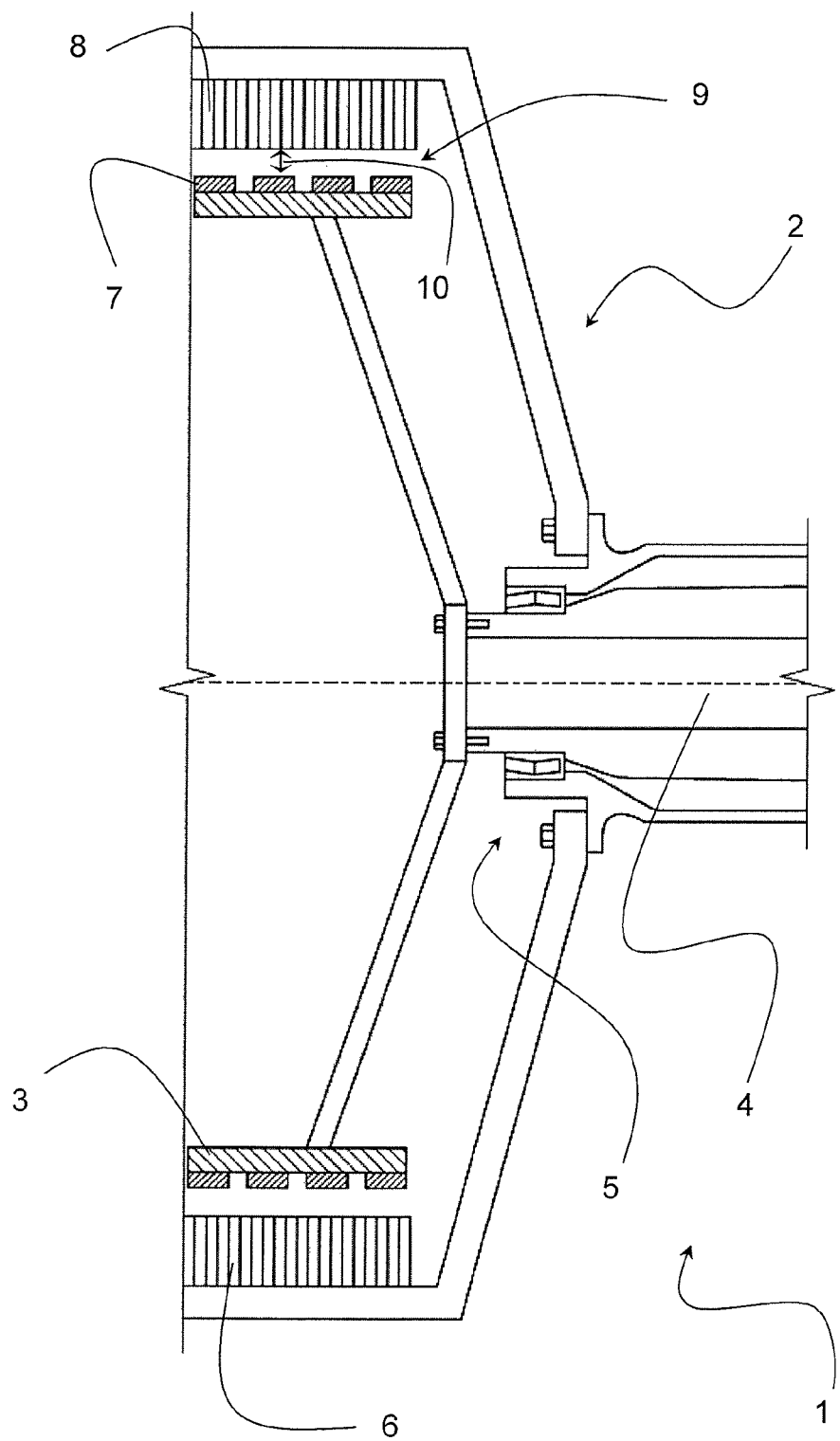
FIG. 1 shows a cross section of an electrical machine with a permanent magnet generator (PMG)

FIG. 1 shows a cross section of a schematic embodiment of an electrical machine 1 in which a PM (permanent magnet) generator 2 may be located. The generator 2 may comprise a rotor 3 connected to a shaft 4 supported in a shaft support arrangement 5. The electrical machine 1 may further support a stator 6.

The rotor 3 may have one or more poles 7 and the stator 6 may have one or more teeth 8 that are separated from the poles 7 by a gap 9 having a gap distance 10 (in a lateral direction).

Figure 2:
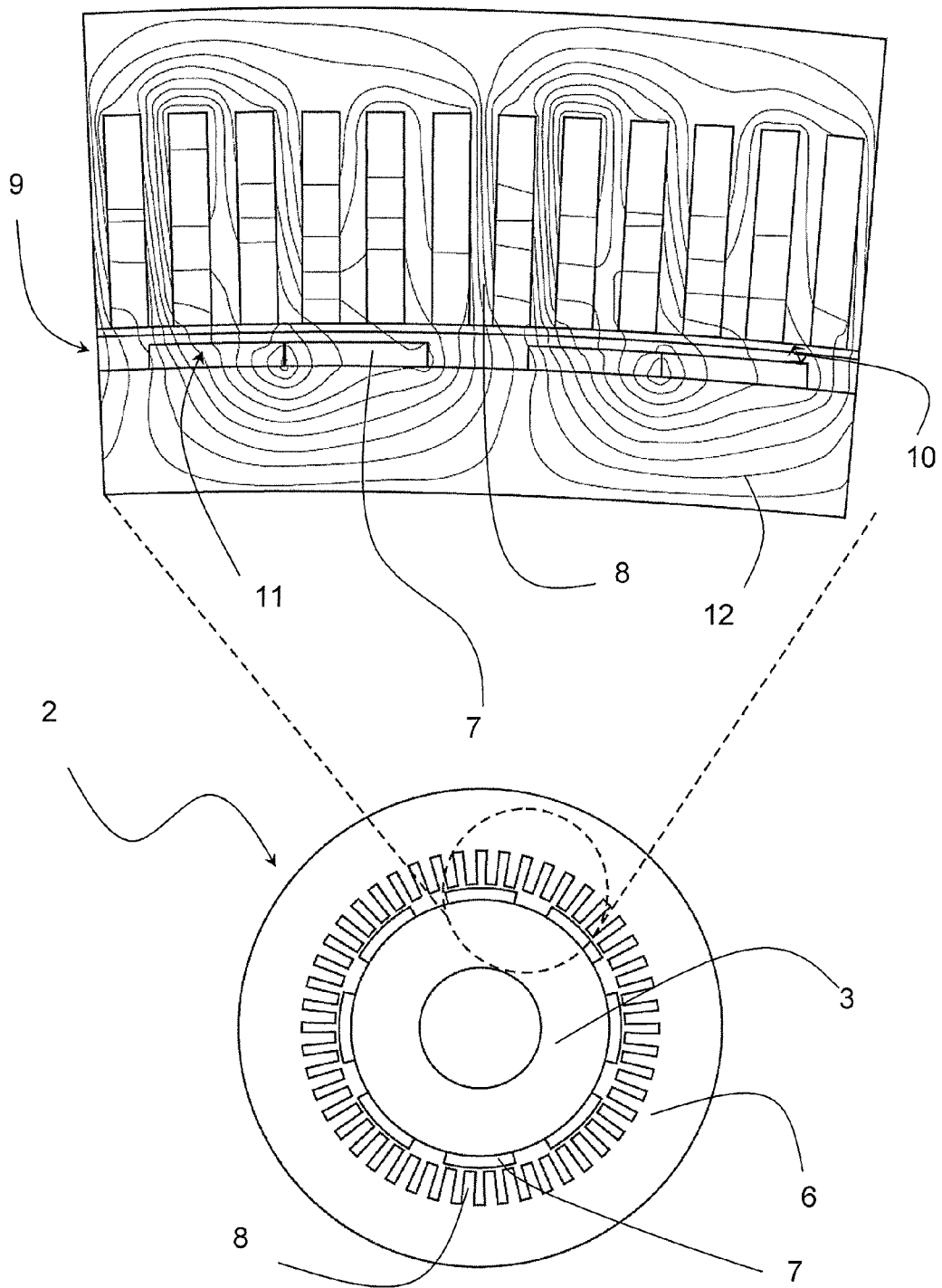
FIG. 2 shows the magnetic flux interaction between the teeth and poles with a magnetic flux intensifier configuration.

FIG. 2 shows a cross section of a schematic embodiment of the generator 2 in which the rotor 3 with the poles 7 may be rotatably arranged inside the electrical machine (not shown). The rotor 3 may be arranged inside the stator 6 so that the poles 7 and the teeth 8 form an electromagnetic coupling extending across the gap 9.

The figure further shows a FEM (finite element method) simulation of an enlarged area where the poles 7 and teeth 8 (and the supporting structures) interact magnetically.

Between the teeth 8 and the poles 7 there is a magnetic flux intensifier 11 or a configuration intensifying, focusing or collecting magnetic flux 12 (represented by the density of flux lines) may be arranged relative to the teeth 8 and the poles 7. The magnetic flux intensifier 11 may be arranged between the teeth 8 and the poles 7.

The magnetic flux intensifier 11 will allow a larger gap distance 10 for the same magnetic interaction and hence performance of the generator 2 thereby allowing for a greater slack.

All things being equal, maintaining the same gap distance 10 will allow for a greater efficiency or a more compact generator 2.

Equally advantageous precious magnetic materials can be saved by using a magnetic flux intensifier 11, whilst maintaining the same gap distance 10 and the same generator power or efficiency.

It is understood that "the same" or "all things equal" means a comparison between a rotor 3' without a magnetic flux intensifier 11 and a rotor 3 with a magnetic flux intensifier 11.

FIGS. 3A-3D show different embodiments of the magnetic flux intensifier 11.

Figure 3:
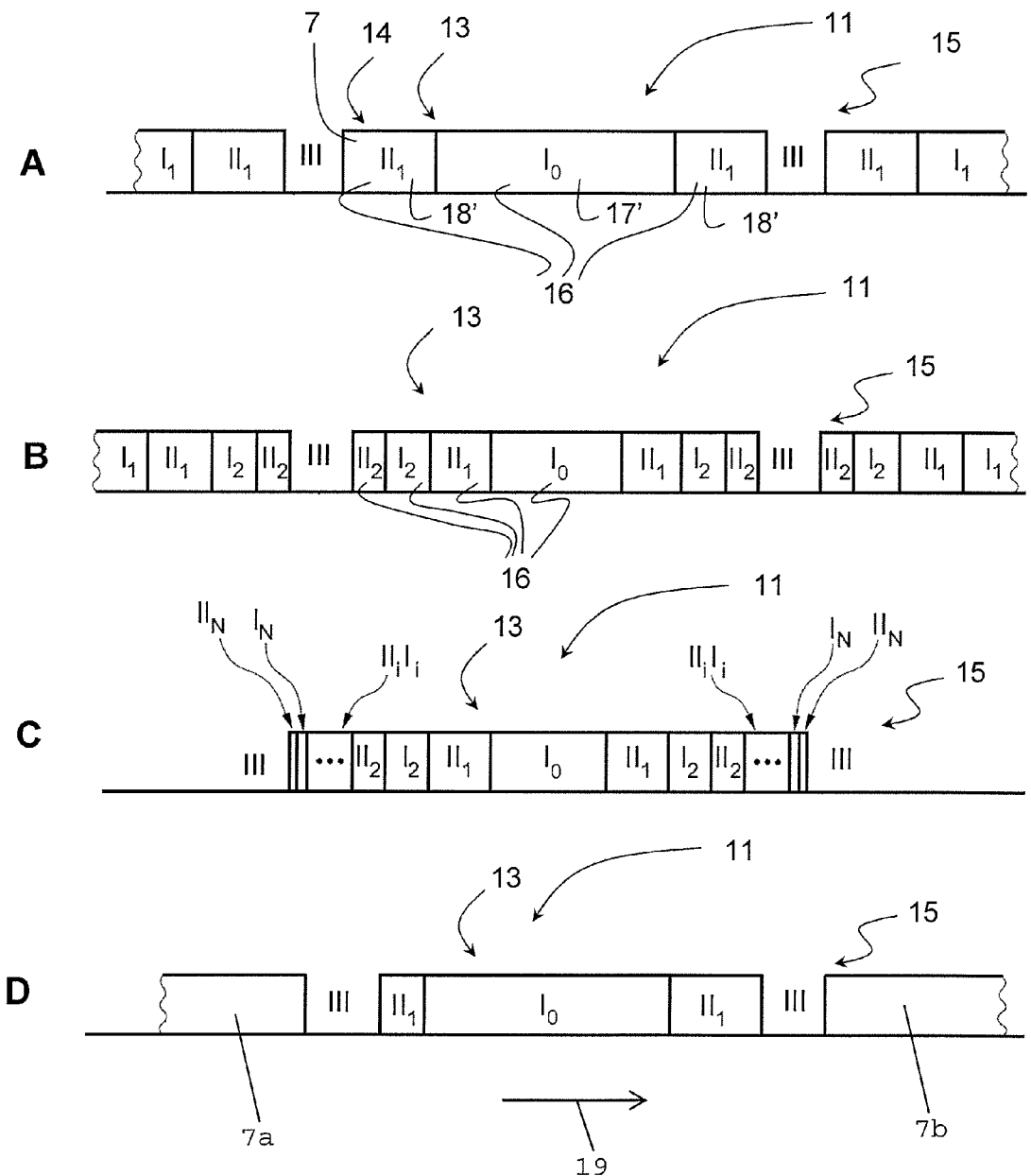
FIGS. 3A-D show different embodiments of the magnetic intensifier shaped as a pole according to the invention.

FIG. 3A shows an embodiment where the pole 7 may be made of a permanent magnetic material 13 and magnetic material 14, i.e., magnetic guiding material in a sandwich 15 construction. The sandwich construction 15 may comprise three layers 16 ($I_0$, $II_1$) of high energy magnetic material 17' placed in a central layer $I_0$ and a layer $II_1$ of low energy magnetic materials 18 placed on both sides of the center layer $I_0$. A gap III may be finally be located at both sides of the outer layers $II_1$ of the low energy magnetic material 18'.

It is understood that low energy magnetic materials 18 can be replaced by magnetic guiding materials 14, but generally both low energy 18 and high energy 17 magnetic materials are permanent magnetic materials 13.

FIG. 3B shows an embodiment of a magnetic flux intensifier 11 having a sandwich construction 15 with further layers 16 of the same strong 17 and low energy 18 magnetic materials placed between the central layer $I_0$ and the gap III. A further layer $I_2$ of the high energy magnetic material 17 may be sided next to the layer $II_1$ of low energy magnetic material 18. A further layer $II_2$ of the low energy magnetic material 18 may be sided next to the further layer $I_2$ of high energy magnetic material 17.

FIG. 3C shows a generic embodiment of a magnetic flux intensifier 11 having a sandwich construction 15 with a predetermined number of successive layers 16 comprising permanent magnetic materials 13. In each direction from the center $I_0$, the layers 16 extend towards the gap III as $I_i$, $II_i$ for i=1 to N.

FIG. 3D shows an embodiment where the layers 16 are asymmetric. In this particular embodiment, the two layers $II_1$ of low energy magnetic material 18 may have different (arc) lengths where the layer $II_1$ according to a preferred rotational direction 19 of the rotor 3. The (arc) length of the layer $II_1$ located near the front of the magnetic flux intensifier 11 facing an adjacent pole 7b in the rotation direction 19 may have a greater (arc) length that the same layer $II_1$ facing an adjacent pole 7a in the opposite direction, or vice versa.

The thickness or the (arc) length of the layers 16 are subject to vary according to design parameters and a person skilled in the art will use either simple experimentation or computational modeling to find the right variations of the layers.

A starting point will be that the layers 16 from the center $I_0$ towards to the gap III become thinner and thinner.

Figure 4:
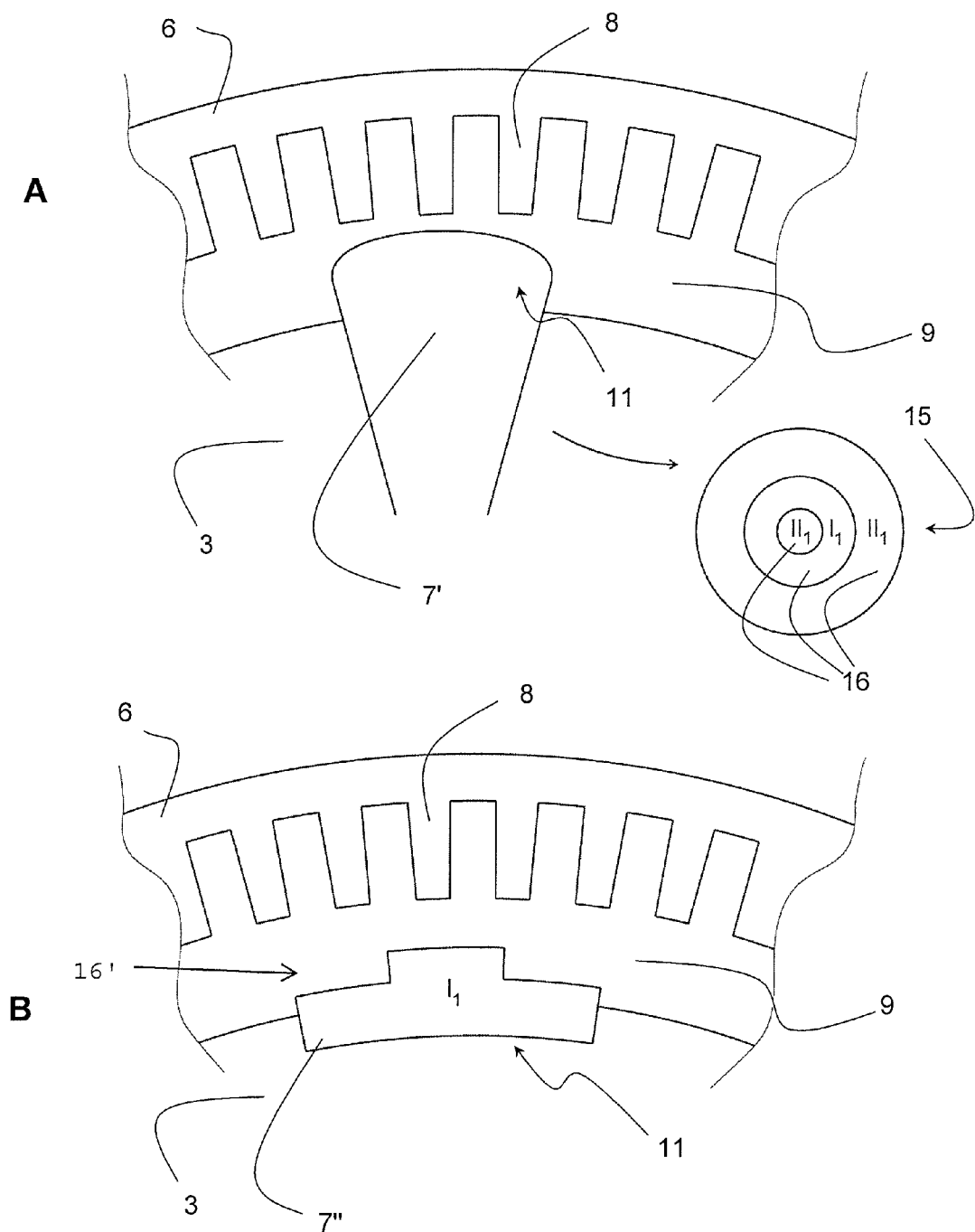
FIGS. 4A & 4B show alternative embodiments of the magnetic flux intensifier shaped as a pole.

FIGS. 4A & 4B show alternative embodiments of magnetic flux intensifier 11.

FIG. 4A shows an embodiment, where the pole 7' may be configured with a magnetic flux intensifier 11 having a trapezoidal cross-sectional shape. The pole 7' may have a sandwich construction 15 of at least three layers 16 where each layer 16 may be configured as a circle.

FIG. 4B shows an embodiment, where the pole 7" may be configured with a magnetic flux intensifier 11 shaped by a single layer 16 of a high energy magnetic material 17 but with less magnetic material in the outer part of the layer 16' facing the teeth 8 of the stator 6 than in the inner part facing the center of the rotor 3. The layer 16' may form a sandwich construction 15 where the outer layers or parts have equivalent magnetic properties compared to the layers of the low energy magnetic material 18.

Figure 5:
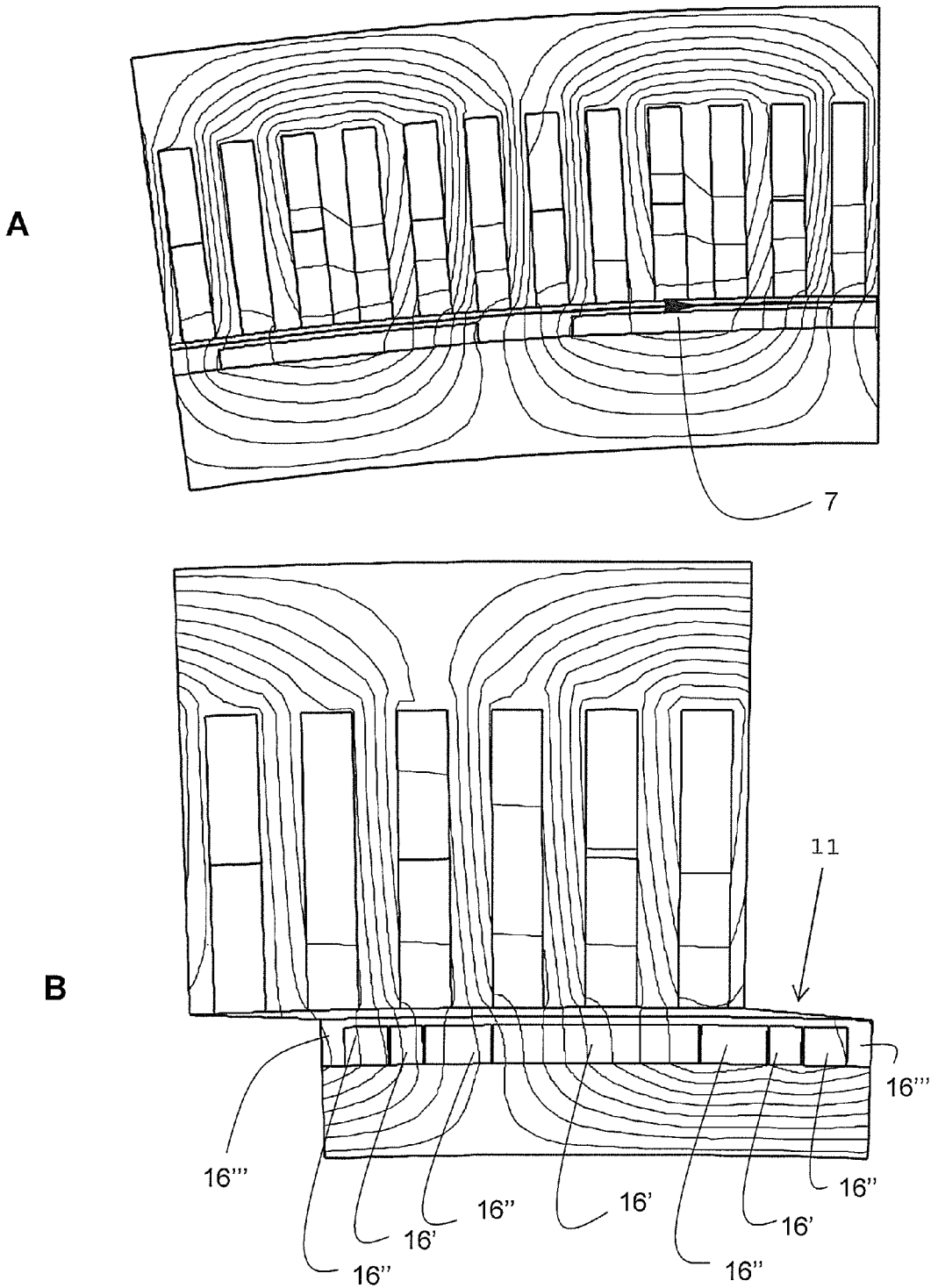
FIGS. 5A & 5B show a specific comparative example of the magnetic interaction between stator teeth and rotor poles in a case without and with a magnetic flux intensifier.

FIGS. 5A & 5B illustrate comparative examples of magnetic interactions for the electrical machine 1 configured as a wind turbine generator. FIG. 5A shows the generator without a magnetic flux intensifier 11 and FIG. 5B shows the generator with a magnetic flux intensifier 11 configuration.

The permanent magnet height is 10 mm and 2269000 mm3 volume per pole or equivalent to 17.0 kg. The gap distance is 6.6 mm.

A strong magnet material variant of Neodymium is used as the pole 7 in FIG. 5A.

A combination of a mixed Ferrite as a low energy magnetic material 18 and Neodymium as a high energy magnetic material 17 is used in FIG. 5B.

The effect of using a magnetic flux intensifier 11 may be scaled to a particular application, such as a generator for a wind turbine. The values based on reliable scaling of dimensions, resources and costs for a 3.6 MW generator are summarized in the following table:

|  | Convential Without magnetic flux intensifier according to FIG. 5A | Invention With magnetic flux intensifier according to FIG. 5B |
|---|---|---|
| Wind Turbine |  |  |
| Nominal Power [MW] | 5.4 | 5.4 |
| Rotor diameter [m] | 140 | 140 |
| Rotational speed [rpm] Generator | 12.6 | 12.6 |
| Number of poles | 112 | 112 |
| Outer diameter [m] | 7.00 | 7.00 |
| Active materials [t] | 52 | 41 |
| Estimated costs [kEUR] | 516 | 449 |

Thereby, the advantages of using a magnetic flux intensifier according to the invention are readily apparent.

A person skilled in the art will appreciate, that the above sandwich construction 15 with a $I_1$, $II_1$, $I_2$, $II_2$-configuration of layers 16 of high energy magnetic materials 17 and low energy magnetic materials 18 around a central layer $I_0$ of high energy magnetic materials 17 as a starting point. The configuration of the layers 16 in the sandwich construction 15 may be optimized to a particular application, such as adding more layers 16 or altering the (arc) lengths of the layers 16.

What is claimed is:

1. An electrical machine, comprising:
   a rotor configured to rotate in a direction relative to a stator, where the rotor comprises one or more poles configured to rotate in an angle relative to a center of the rotor, where the one or more poles are configured to interact with one or more teeth in the stator via an electromagnetic field;
   wherein the stator is configured to be fixed in a stationary position in the electrical machine, where a gap is provided between the one or more teeth and the one or more poles in a lateral direction;
   wherein at least one magnetic flux intensifier is arranged relative to at least one of the one or more poles and at least one of the one or more teeth, where the magnetic flux intensifier is configured to concentrate magnetic field lines between said at least one of the one or more poles and said at least one of the one or more teeth during rotation of the rotor,
   wherein the magnetic flux intensifier comprises a first type layer of a high energy magnetic material with magnetic field lines oriented essentially laterally, and at least a second type layer of a second magnetic material having a magnetic strength that is lower than that of the high energy magnetic material, and wherein the first type layer is located between two second type layers, and wherein the magnetic flux intensifier comprises a predetermined number of successive additional first and second type layers around a central layer defined by the first type layer, wherein a first successive type layer of a high energy magnetic material is located against a second successive type layer of a second magnetic material having magnetic properties that differ from the properties of the high energy magnetic material, and wherein at least one third type layer is located at opposite sides of the successive additional first and second type layers.

2. The electrical machine according to claim 1, wherein the magnetic flux intensifier is configured as a pole in which the first and second type layers, over an arc length, form a sandwich of layers and where the at least one third type layer forms a gap between the second type layer and one of the one or more poles located adjacent to the magnetic flux intensifier.

3. The electrical machine according to claim 2, wherein the magnetic flux intensifier further comprises at least another first type layer which is located between the second type layer and the at least one third type layer and comprises a high energy magnetic material with magnetic field lines oriented essentially laterally.

4. The electrical machine according to claim 3, wherein the magnetic flux intensifier further comprises at least another second type layer which is located between the another first type layer and the at least one third type layer and comprises a second magnetic material having magnetic properties that differ from the properties of the high energy magnetic material.

5. The electrical machine according to claim 1, wherein each successive additional first and second type layer has an arc length that decreases from a central layer towards the at least one third type layer.

6. The electrical machine according to claim 5, wherein the magnetic strength of at least the high energy magnetic material in each successive additional first and second type layer decreases from the central layer towards the at least one third type layer.

7. The electrical machine according to claim 1, wherein the magnetic strength of at least the high energy magnetic material in each successive additional first and second type layer decreases from the central layer towards the at least one third type layer.

8. The electrical machine according to claim 1, wherein at least one of the successive additional first and second type layers located at one side of the central layer has an arc length that differs from the arc length of the same successive layer located at the opposite side of the central layer.

9. The electrical machine according to claim 1, wherein the magnetic flux intensifier has a trapezoidal shape, and wherein the first and second type layers are configured as circles.

10. The electrical machine according to claim 1, wherein the magnetic material of the first type layer is from a group of magnetic materials having a magnetic remanence Br above 0.5 Tesla.

11. The electrical machine according to claim 1, wherein the magnetic material of the second type layer is from a group of magnetic materials having a magnetic remanence Br below 0.5 Tesla.

12. The electrical machine according to claim 1, wherein the electrical machine is one of a generator for generating power and a motor for driving a drivable unit.

13. The electrical machine according to claim 1, wherein the magnetic material of the first type layer is from a group of magnetic materials having a magnetic remanence Br above 1 Tesla.

14. The electrical machine according to claim 1, wherein the magnetic material of the first type layer comprises at least neodymium.

15. The electrical machine according to claim 1, wherein the magnetic material of the second type layer is from a group of magnetic materials having a magnetic remanence Br below 1 Tesla.

16. The electrical machine according to claim 1, wherein the magnetic material of the second type layer is made of iron or a ferrite alloy.

17. Method of making a pole with a magnetic flux intensifier having a rotor configured to rotate in a direction relative to a stator, the rotor having one or more poles configured to rotate in an angle relative to a center of the rotor, wherein the poles are configured to interact with one or more teeth in a stator via an electromagnetic field and at least one magnetic flux intensifier configured to concentrate the magnetic field lines between the poles and the respective one or more teeth (8) during rotation of the rotor, comprising the steps of:

making a planar sandwich of successive first type layers of a high energy magnetic material and second type layers of a second magnetic material having a magnetic strength that is lower than that of the high energy magnetic material, bending the planar sandwich around a center point of a central first type layer into a curvature defined by the curvature of a core of the rotor and the stator, and arranging the magnetic flux intensifier (11) with the first type layer (I.sub.0) of a high energy magnetic material (17) with magnetic field lines oriented essentially laterally, wherein the first type layer is located between two second type layers, and wherein the magnetic flux intensifier comprises a predetermined number of successive additional first and second type layers around a central layer defined by the first type layer, wherein a first successive type layer of a high energy magnetic material is located against a second successive type layer of a second magnetic material having magnetic properties that differ from the properties of the high energy magnetic material, and wherein at least one third type layer is located at opposite sides of the successive additional first and second type layers.

* * * * *